UNITED STATES PATENT OFFICE.

LEONHARD LEDERER, OF SULZBACH, GERMANY.

PROCESS OF MAKING ACETYL CELLULOSE.

SPECIFICATION forming part of Letters Patent No. 654,988, dated July 31, 1900.

Application filed March 16, 1900. Serial No. 8,970. (No specimens.)

*To all whom it may concern:*

Be it known that I, LEONHARD LEDERER, a citizen of Germany, residing at Sulzbach, in the Kingdom of Bavaria, Germany, have invented certain new and useful Improvements in Processes for Producing Acetyl Cellulose, of which the following is a specification.

The acetylization of cellulose by means of acetic anhydride heretofore could be made possible only by heating the cellulose with the anhydride to a high temperature for a considerable length of time. As has been found, acetyl cellulose is obtained simply and easily by first converting cellulose into hydrocellulose and then adding it to acetic anhydride in presence of sulfuric acid, whereby the hydrocellulose is converted into acetyl cellulose.

Upon hydrocellulose as obtained by the process of Girard (*Annales de Chimie et de Physique*, 5. Ser. Vol. 24, p. 350) by treating cellulose with three per cent. sulfuric acid for some minutes and by heating it to about 70° centigrade in a closed receptacle for about three hours after it has been pressed and dried is poured the fourfold quantity of acetic anhydride. The reaction takes place in a short time under evolution of heat. The action having been completed, the product is mixed with water, whereon after washing and drying the acetyl cellulose is obtained as a gravelly powder soluble in chloroform and nitrobenzole.

If the hydrocellulose has not been obtained by Girard's process by means of sulfuric acid, but by another process without the aid of sulfuric acid, a small amount of sulfuric acid—about one-fourth to one-half per cent. of the weight of the anhydride—must be added to the acetic anhydride for acetylization, because without presence of sulfuric acid acetylization by means of acetic anhydride does not succeed at a low temperature.

What I do claim as my invention, and desire to secure by Letters Patent, is—

1. A process for producing acetyl cellulose consisting in converting cellulose into hydrocellulose and adding the latter to acetic anhydride in presence of sulfuric acid.

2. A process for producing acetyl cellulose consisting in adding hydrocellulose to acetic anhydride in presence of sulfuric acid.

In testimony that I claim the foregoing as my invention I have signed my name in presence of two subscribing witnesses.

LEONHARD LEDERER.

Witnesses:
 FERDINAND SCHRAUD,
 JOHANN STROBEL.